United States Patent [19]

Jaluzot

[11] Patent Number: 4,813,146
[45] Date of Patent: * Mar. 21, 1989

[54] METHOD AND DEVICE FOR OBTAINING NUMERICAL COORDINATES OF A POINT OR A SET OF POINTS

[75] Inventor: Yves Jaluzot, Montville, France

[73] Assignee: V.Com S.A., Bevaix, Switzerland

[*] Notice: The portion of the term of this patent subsequent to Aug. 21, 2003 has been disclaimed.

[21] Appl. No.: 667,897

[22] Filed: Nov. 2, 1984

[30] Foreign Application Priority Data

Nov. 10, 1983 [FR] France ................ 83 17876

[51] Int. Cl.⁴ .................................. G01B 3/00
[52] U.S. Cl. .................. 33/1 M; 33/27 K, 33/1 PT; 33/444
[58] Field of Search .......... 33/1 M, 1 N, 1 PT, 27 K, 33/32 C, 444, 18 R

[56] References Cited

U.S. PATENT DOCUMENTS

| | | | |
|---|---|---|---|
| 3,553,842 | 1/1971 | Gerber et al. | 33/1 M |
| 3,564,533 | 2/1971 | Linn | 33/1 M |
| 3,758,949 | 9/1973 | Fausel et al. | 33/1 M |
| 4,069,588 | 1/1978 | Hoppe | 33/1 M |
| 4,412,383 | 11/1983 | Landa | 33/1 M |
| 4,500,749 | 2/1985 | Khoshnevis | 33/1 M |

*Primary Examiner*—Willis Little
*Attorney, Agent, or Firm*—Bucknam and Archer

[57] ABSTRACT

A device for obtaining numerical coordinates of a point or a set of points comprises two stretched strips having a common end attached to a stylus which is placed on a point or moved over a set of points. Each of the other ends of each strip is supplied from a strip reserve consisting of pulleys connected to a restoring spring for applying tension to the strips. Variations in length of the strips are measured in discrete values by a mechanism associated with a computer for correcting the effective length of each strip.

14 Claims, 5 Drawing Sheets

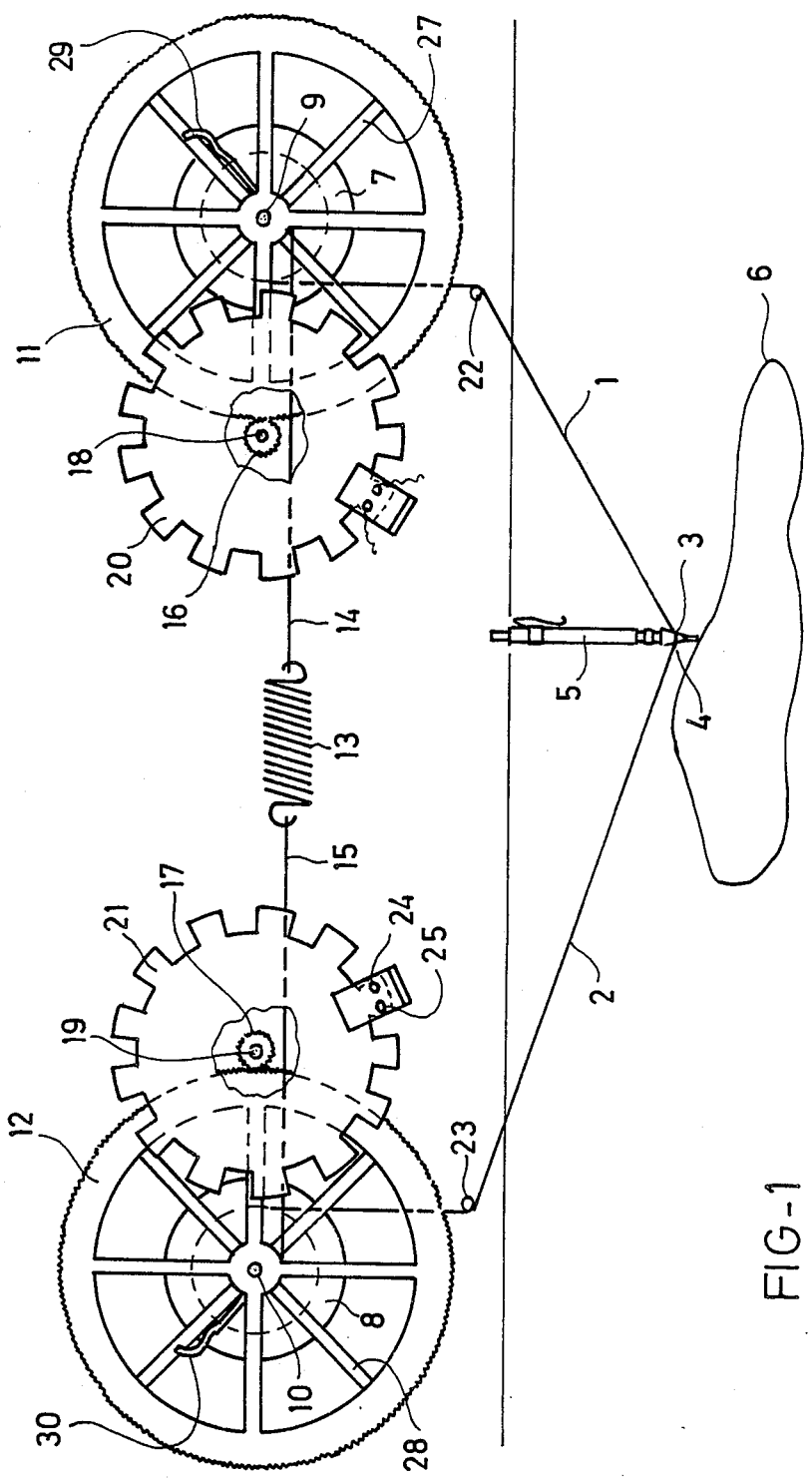

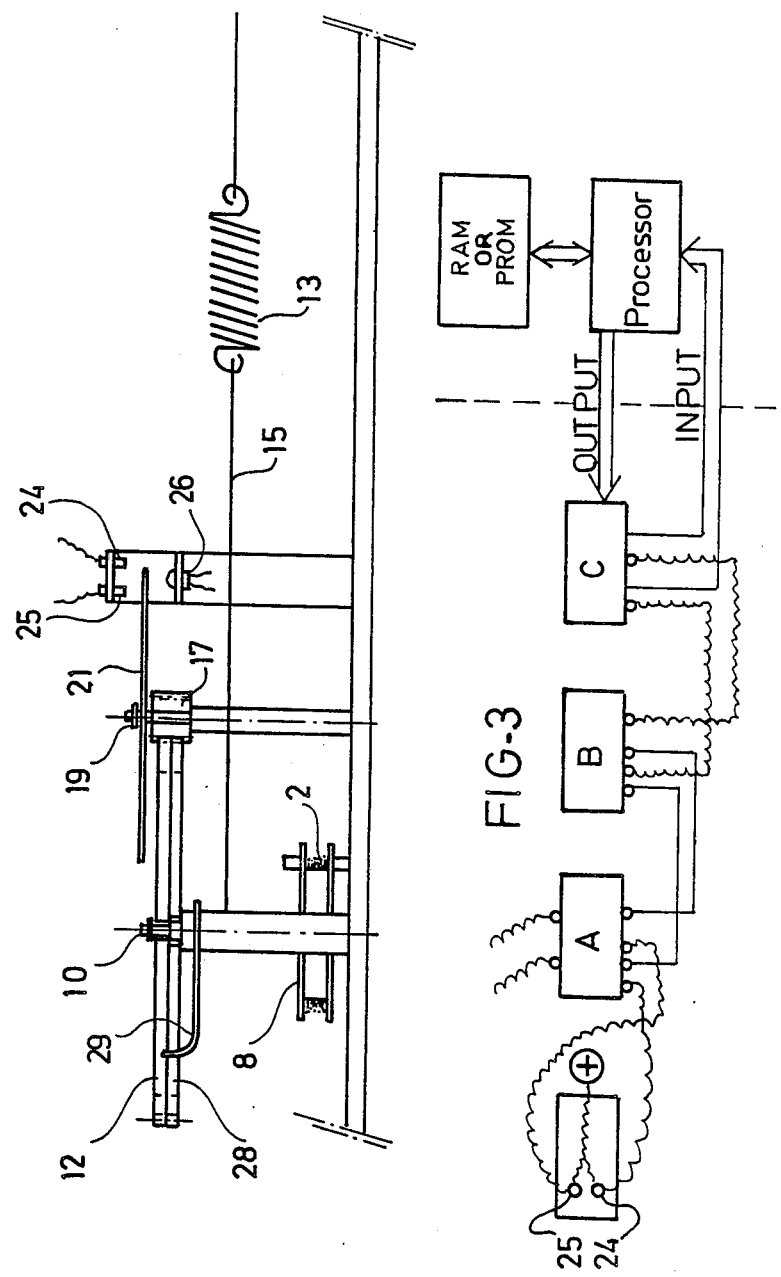

METHOD AND DEVICE FOR OBTAINING NUMERICAL COORDINATES OF A POINT OR A SET OF POINTS

BACKGROUND OF THE INVENTION

1. Field of the Invention

The present invention relates to the field of location and plotting of a point or a set of points.

The invention is more particularly directed to a method and a device for determination and plotting with enhanced accuracy and for the purpose of subsequent reproduction if necessary, of graphs, curves, time-dependent variations in displacement and more generally of any patterns having one, two or even three dimensions, for checking signatures, recording "know-how" or measuring distances, as well as other applications which will be indicated in greater detail in the following specification.

2. Description of the Prior Art

A number of different solutions have already been proposed for computer entry or acquisition of cartesian coordinates in real time for the purpose of display or subsequent processing.

Consideration has thus been given to the use of a device in which conductor wires are arranged in webs or parallel arrays corresponding to the XY cartesian coordinates and embedded in a suitable material, location of the point or set of points being performed by means of a sensing pen or electromagnetic radiation emitter.

Similarly, it has been propsed to form each web of XY coordinates by means of a parallel beam of laser light rays.

Use has already been made of supports representing a variable resistance, determination of the coordinates of each point being performed by means of the electric contact produced by a pen.

Other devices consist of a potentiometer equipped with mechanical arms. As an alternative to orthonormal arms, the devices can be adapted to satisfy polar coordinates.

Another device proposed in the prior art consists of a matrix of phototransistors or of a web of optical threads. In this device, the pencil used for determining the position of the point to be located was provided with sensing devices.

There has also been developed an electroacoustic system mounted on metal supports for determining the time of propagation of shock waves by utilizing the piezoelectric properties of a crystal.

In U.S. Pat. No. 3,665,608, there was described a device for locating the position of a point, comprising a stylus inserted in two superposed cylinders. Two threads are fixed around the cylinders whilst the other end of the threads are wound around two drums. When the stylus is moved, one drum or both drums consequently rotate in order to accommodate the change in length of the threads. The angular position of each drum is measured by so-called angle transducers, the output of which is coupled with a computer in order to obtain the position of the stylus. This patent is therefore based on the principle of determination of angles and not determination of distances.

In German Pat. No. 2,245,178, a device was proposed for transmitting arbitrary movements in order to produce a signal which is representative of the three-dimensional movement of a point. This device comprises three elements around which are coiled threads connected at one end to a pencil. Traction means apply constant tension to the threads, with the result that the output signal of the converter is representative of the displacement of the thread with respect to the traction means. Measurement of length of the threads is therefore performed continuously by potentiometer.

Finally, it has been proposed to employ an ultrasonic-wave emitting pen, sensors being fixed on the edges of the device employed.

The solutions mentioned in the foregoing have all led to generally positive results in regard to the accuracy achieved in determinations of coordinates although the degree of accuracy varies considerably from one type of apparatus to another.

However, it will readily be apparent that these solutions make it necessary to provide cumbersome equipment which is costly to produce in most instances, particularly in the case of the most accurate types of apparatus.

Furthermore, such solutions involve the use of means which lack flexibility of operation and are often incompatible with high-speed plotting operations in which accurate performance has to be maintained.

SUMMARY OF THE INVENTION

The object of the invention is to offer a novel solution to the problem of plotting coordinates of a point or of a set of points. More particularly, the invention makes it possible to provide a device and a method for obtaining numerical coordinates of a point or set of points and to carry out acquisition of said coordinates for subsequent storage in a computer by means which are both simple, of small size, accurate and rapid.

The method in accordance with the invention consists in discrete measurement of the variation in length of two strips having a common end attached to a stylus which is placed on the point or which is moved over a set of points. Each of the other ends of each strip is supplied from a strip reserve provided with restoring means for applying tension to said strips.

The strip reserves can consist of two pulleys on which each strip is wound.

The term "strip" as used in this specification is understood to mean an element having a general longitudinal configuration, a small or negligible thickness and a certain degree of flexibility. More particularly, films or threads are condsidered as strips in the sense in which they are to be understood in this desciption. In all cases, the strips are passed around pulleys, thus forming a reserve of strips.

Thus, a strip can be constituted by a film provided with lines which are alternately opaque and transparent, transverse and parallel, and uniformly spaced.

During displacement of the film, that is to say during displacements of the stylus, the aforesaid lines of the film pass in front of a reading head.

The opaque and transparent lines of the film can be formed by techniques which are known per se and call for no further discussion since they are within the capacity of anyone skilled in the art. Examples which are nevertheless worthy of mention, however, include deposition of an opaque coating on transparent film or impression by photosensitive coating although these examples are clearly given solely by way of illustration without thereby implying any limitation of the invention.

The reading head determines the displacements of the film by discrete values by means of two photoemitters and two photoreceivers placed on each side of said film.

There is preferably interposed between each film and the photoreceivers a window constituted by an opaque element having two openings which are parallel to the aforesaid lines of the film and the height of which is slightly smaller than the half-height of said film. Said openings are located substantially one above the other with a slight relative displacement in the direction of motion of the film. The result thereby achieved is that the photoreceivers are exposed to light and darkness in alternate sequence, thus producing a signal of the sine-wave type with a relative displacement of the order of one-quarter of a period between the signal transmitted by one and the same line of a film.

As has been noted earlier, strips can also be constituted by threads.

In this case, each pulley drives in rotation a toothed wheel having the same shaft. Said toothed wheel in turn drives in rotation by means of its toothed annulus a pinion which is rigidly fixed to a castellated wheel, the common shaft of which is parallel to the shaft of the pulley and of the toothed wheel.

In this case, the displacement of the tooth spaces of each castellated wheel is measured by means of two phototransistors which are placed on one side of the tooth space of each castellated wheel and are adapted to cooperate with an oppositely-facing light source placed on the other side of each wheel aforesaid.

Preferably, each thread which extends from its pulley to the stylus is passed around a guide stud or post.

Whether the srips are constituted by films, threads or any other element of a longitudinal type, the means for determining the value and direction of displacements of said strips are preferably connected to a computer. The computer comprises means for correcting the effective length of these strips as a function of the number of turns of these latter around their respective pulley and as a function of the length of their path around their guide post or stud and the pulleys, as well as means for taking into account the expansion resulting from variations in temperature and in the degree of humidity. In fact, when the strip consists of a film, only variations in temperature and in the degree of humidity need to be corrected.

The invention further relates to a device for obtaining the numerical coordinates of a point or a set of points. Said device comprises two stretched strips of the type aforementioned, a common end of each strip being attached to means for taking up a position on said point or passing over the set of points, each of the other ends being supplied from a strip reserve.

The distinctive feature of the device lies in the fact that it further comprises means for measuring by discrete values the variations in length of each of said strips.

As has already been mentioned, the strip reserves can consist of two pulleys on which the strips aforesaid are wound.

These strips can be constituted by any longitudinal element of small thickness and of sufficient flexibility to be wound on a member of the pulley type. Said strips can thus consist of films or threads, for example.

When the strips consist of films, these latter are provided with parallel transverse lines which are opaque and transparent in alternate sequence and in uniformly spaced relation. When the stylus passes over a set of points, the films move in front of a reading head.

The term "transverse" used in the foregoing is understood to mean that the lines are perpendicular to the greatest length of the film or to its direction of displacement, which amounts to the same thing.

Each reading head assigned to the film comprises, in its most simple form, two photoemitters which are placed one above the other on one side of each film and are adapted to cooperate with two photoreceivers located in the same configuration, opposite to the two photoemitters and on the other face of each film aforesaid.

The reading head is advantageously provided in addition with a window placed between each film and the photoreceivers. Said window is formed by an opaque element having two openings which are parallel to said lines and the height of which is slightly smaller than the half-height of said lines. Said openings are located substantially one above the other with a slight relative displacement in the direction of motion of said films.

When the strips consist of threads, the means for measuring the variations in length of these threads consist of two toothed wheels which are mounted respectively on the same shaft as each pulley and the teeth of which are adapted to cooperte with a pinion mounted in rigidly fixed relation to a castellated wheel, the common shaft of which is parallel to the shaft of each of said pulleys and toothed wheels.

The device can be provided in addition with means for determining the value and direction of displacements of each castellated wheel. These means are advantageously constituted by two phototransistors or photoreceivers which are placed on one side of the tooth space of each castellated wheel and are adapted to cooperate with a light source such as an electroluminescent diode or more generally one or a number of photoemitters placed opposite to each wheel aforesaid.

Whether the strips consist of films or threads, the devicfe can comprise two guide posts or studs placed between the pulleys and that end of said strips which is attached to the stylus.

The device is provided with means for applying a restoring force to each toothed wheel. By way of example, these means are formed by a helical spring attached at both ends to two threads which are attached in each case to the shaft of each toothed wheel.

The device can further comprise two additional toothed wheels which are identical with the first toothed wheels and mounted to rotate freely on the same shaft in adjacent relation to these latter, a spring secured to said shaft being adapted to cooperate with said additional wheels.

Whether the case under consideration is that of a film or a thread, the means for measuring by discrete value the variations in length of said strips are constituted by a photoemitter-photoreceiver assembly.

Both in this specification and in the appended claims, the expression "photoemitter" is considered as equivalent to a light source or to an electroluminescent diode. This expression also includes all equivalent means which emit radiation and which can be associated with photoreceivers or with phototransistors which detect variations in intensity of radiations emitted by the photoemitters and convert them to a signal such as an electric signal, for example, which can be utilized and interpreted.

The means for measurement by discrete values of variations in length of the strips can be connected to a computer. The computer is provided with means for correcting the effective length of each strip aforesaid as a function of the number of turns of the strips around their respective pulley and as a function of the length of the path around their guide stud or post and pulleys. The computer further comprises means for taking into account the ambient temperature and degree of humidity. When the strip consists of a film, only variations in temperature and degree of humidity need to be corrected.

BRIEF DESCRIPTION OF THE DRAWINGS

Other features of the invention will be more apparent upon consideration of the following description and accompanying drawings, wherein:

FIG. 1 is a schematic top view of a first embodiment of the device in accordance with the invention in which the strips consist of threads;

FIG. 2 is a partial front view of the device of FIG. 1;

FIG. 3 is a block diagram of the electronic device which is connected to the phototransistors;

DESCRIPTION OF THE PREFERRED EMBODIMENTS

Figure 4:
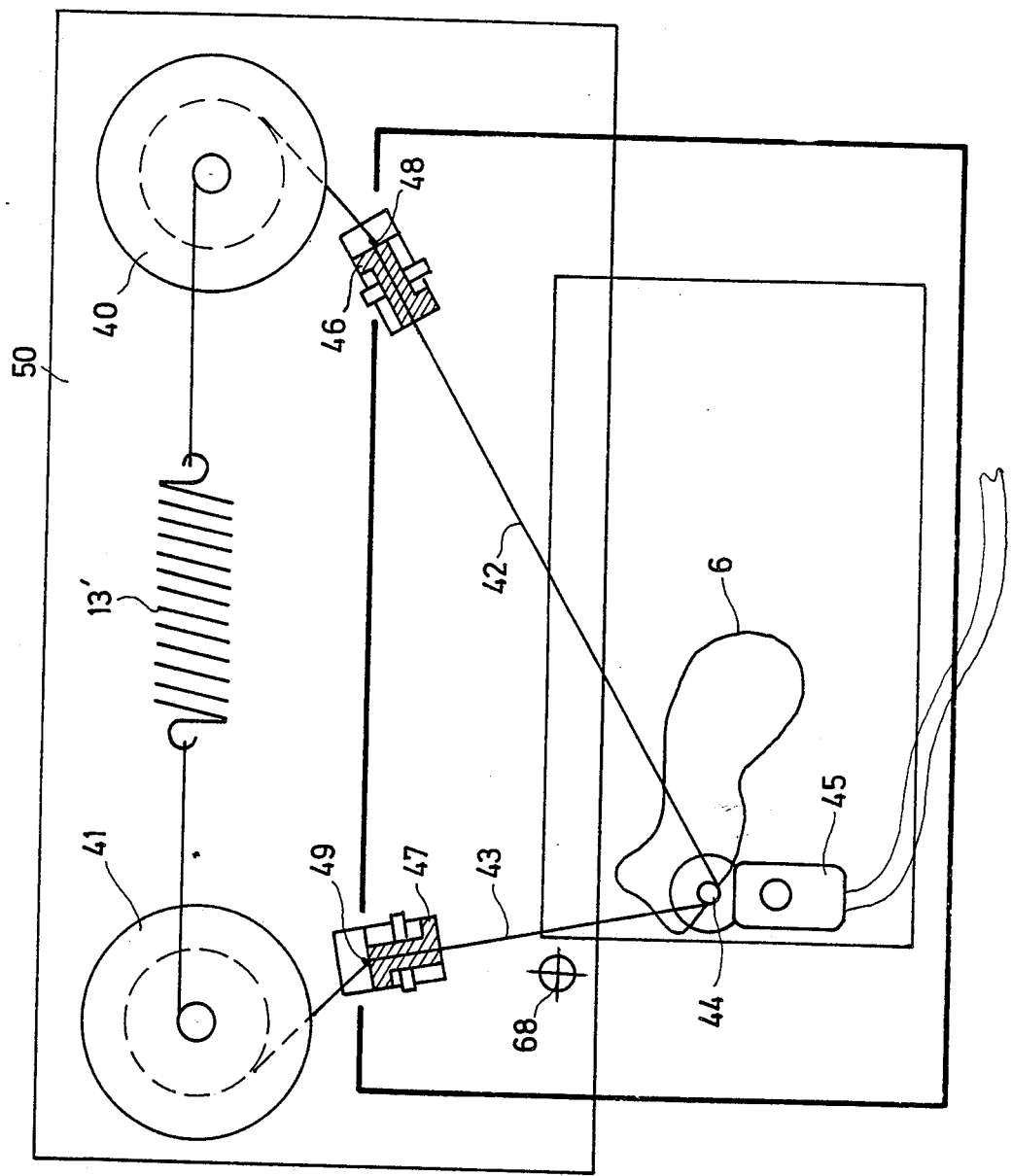
FIG. 4 is a schematic top view of a second embodiment of the device in accordance with the invention in which the strips consist of films.

The device illustrated in FIG. 1 comprises two threads 1, 2, a common end 3, 4 of which is attached to a stylus 5 which can be moved along a pattern 6.

These two threads are attached under tension to means for determining the length and variation in length of the threads 1 and 2 at the time of displacement of the stylus 5 along the pattern 6.

The means aforesaid comprise two pulleys 7, 8 which rotate respectively about a shaft 9, 10 and on which are wound the threads 1, 2.

Two toothed wheels 11, 12 are provided above said pulleys and are rotatably mounted on the same shaft 9, 10. Tensioning of the threads 1, 2 is produced by means of a helical spring 13 which is attached to the shafts 9, 10 by means of two threads 14, 15.

The value of this tension will be determined by those versed in the art by taking into account the strength of the thread and its limit of inextensibility since it is clearly desirable to use inextensible or practically inextensible threads in order to obtain satisfactory accuracy.

It is worthy of note that, in the field of application of the present invention, threads of Kevlar subjected to a tension of 50 g have been considered as suitable and achieve a satisfactory standard of accuracy.

During displacement of the stylus 5, the threads 1 and 2 drive the toothed wheels 11 and 12 in rotation and these latter in turn drive two toothed pinions 16, 17 which are capable of rotating freely respectively about two shafts 18, 19.

The pinions 16, 17 mentioned above are rigidly fixed respectively to two castellated wheels 20, 21.

As a result of the amplification produced by the assembly comprising pulleys (7,8)—toothed wheels (11, 12)—toothed pinions (16, 17)—castellated wheels (20, 21), a point of the castellated wheel which is located at the periphery of this latter is permitted to undergo a displacement of 4 mm in respect of a displacement of the thread of 1/10 mm, thus making it possible to measure variations in length of the threads 1 and 2 and to determine the coordinates of the point on which the stylus 5 is located.

It will be noted in the drawings that provision is made for two guide studs or posts 22 and 23 between the pulleys 7, 8 and the common ends 3 and 4 of the threads 1 and 2.

In order to determine variations in rotation of the castellaed wheels 20, 21, provision has been made for a device comprising photoreceivers (phototransistors) and photoemitters (electroluminescent diodes). For the description of this device, reference will be made to FIG. 2 in which are shown two phototransistors 24, 25 placed on one side, more particularly above the castellated wheel 21. Opposite to said phototransistors but on the other side of the castellated wheel 21, there is placed a light source 26 which, in the case of the figure, is an electroluminescent diode.

As can readily be understood, a device which is similar to that shown in FIG. 2 is present in the second symmetrical portion of the device which is attached to the thread 1, the portion described being attached to the thread 2.

The dimensions of the tooth spaces of the castellated wheel 21 (and the corresponding wheel 20) as well as the distance between the phototransistors 24, 25 are chosen so as to ensure that, during rotation of the wheel 21 about its shaft 19, one of the phototransistors can be released and therefore produce action on the electroluminescent diode 26 whilst the other phototransistor is still masked by the raised portion of the castellated wheel.

Thus, if the distance between two tooth spaces corresponds to a displacement of the stylus over a distance of 4/10 mm, it will be possible to determine variations of 1/10 mm since the device makes it possible to differentiate the moment at which the two phototransistors are masked by the electroluminescent diode, the moment at which one of these phototransistors produces action on the electroluminescent diode, and finally the moment at which the two phototransistors produce action on the electroluminescent diode.

Similarly, since the direction of displacement of the toothed wheel 21 permits alternate release of one phototransistor or the other, it will be possible while plotting is in progress to determine the direction of displacement of the wheel and consequently the sign (positive or negative) to be assigned to X or Y displacement of the stylus, X and Y being the cartesian coordinates of the point at which the stylus is located.

In order to increase the accuracy of the device, preference is given to the use of clockwork mechanisms for the toothed wheels 11, 12 and the pinions 16, 17 which serve to drive the castellated wheels 20, 21.

In order to achieve even greater accuracy, provision is advantageously made for a second wheel 27, 28 which, in the case of the figure, is placed beneath toothed wheels 11, 12, is identical with these latter and is of course centered on the same shafts 9, 10.

The second toothed wheels 27, 28 aforesaid are mounted freely for rotation about the shafts 9 and 10 and are each fitted with a restoring spring 29, 30, thus making it possible to take up any play which may develop between said wheels and the pinions 16, 17. This has the effect of enhancing the accuracy of motion transmission and extending the service life of the device in accordance with the invention.

The means for attaching the ends 3, 4 of the two threads 1, 2 to the stylus 5 are not shown in the figure.

Any means will be open to choice for securely and accurately maintaining both threads around the end of the stylus. It will be readily understood, however, that the point of attachment must be located at the level or in the immediate proximity of the marking-point or pencil-lead of the stylus in order to avoid any risk of errors. This attachment will also have to be removable in order to permit replacement of the stylus.

By way of indication, the aforesaid means can consist of a ring or a needle which is attached so as to be freely rotatable and to permit adaptation of the pencil-lead or more generally of the marking-point of the stylus which is chosen.

As mentioned earlier, this stylus can consist of a pen, a dry point, a pencil, or a feeler for dimensional checking. In some cases, the path followed or sighting of the path followed is of little importance since only the starting and arrival points are employed. A device of this type also permits checking of front-face optical-lens curvatures with a ball-bearing as a sighting device. In all cases, the displacement can be performed by hand or can be controlled by a machine. In more general terms, the stylus can consist of means for following a curve of zero thickness and of small thickness with an acceptable degree of accuracy while also enabling the operator to identify the portion of curve which he has already followed. As stated earlier, the stylus can also be moved by a machine, the displacement of which it is desired to control.

The entire device as thus designed can be assembled in a flat block or bar element of small size which can readily be adapted to any drawing board or device which already exists. This constitutes one of the advantages of the invention over the means described earlier since these means usually entail the use of a special graph support in order to achieve the desired acquistion of coordinates.

The electronic device which is connected to each phototransistor is illustrated schematically in FIG. 3. The case shown in the figure relates to the phototransistors 24 and 25 but it will readily be apparent that the electronic device is identical in the case of the phototransistors which are assigned to the other castellated wheel of the device.

Each phototransistor is connected to an amplifier A and this latter is in turn connected to a flip-flop B which is terminated by gates C having three-state outputs. A connection is then established between a processor and said gates C.

Figure 5:
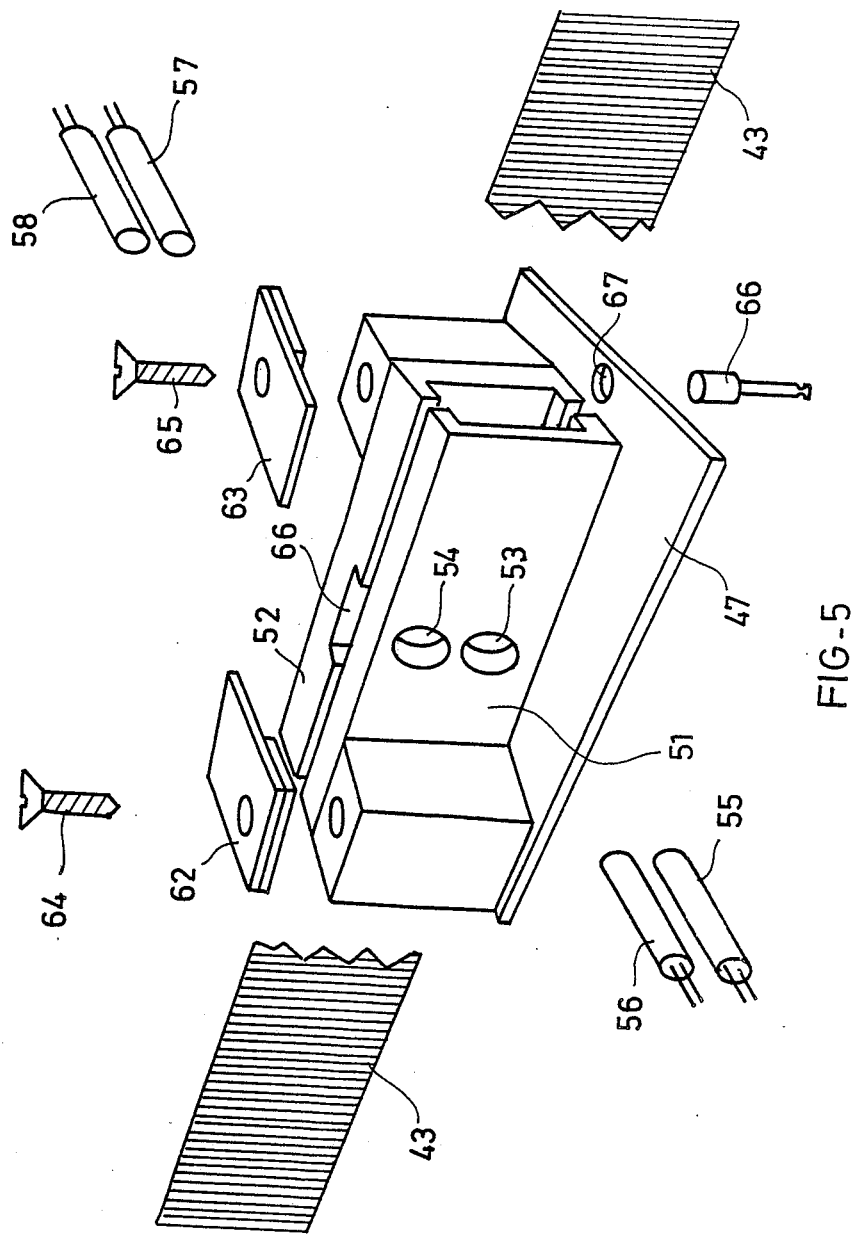
FIG. 5 is a detail view of a reading head shown in FIG. 4.
Figure 6:
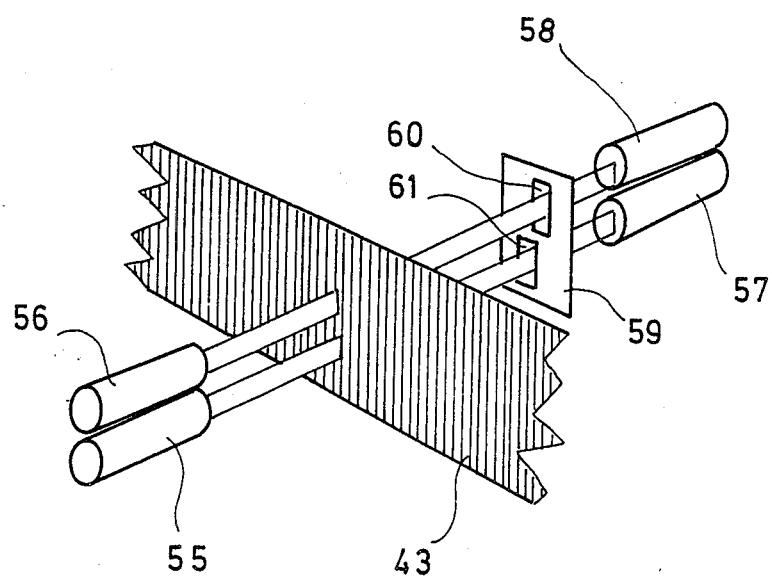
FIG. 6 is a schematic view showing the operation of the reading head with interposition of the window.

In FIGS. 4 to 6, there is shown a preferred embodiment of the invention in which the strips whose variations in length are measured consist of films.

This device is constituted partly by the means already described with reference to FIGS. 1 and 2. These means consist of two pulleys 40 and 41 on which are wound two films 42 and 43. A restoring spring 13' placed between the two pulleys 40 and 41 and attached to these latter performs in this case the same function as the spring 13 in the embodiment of FIG. 1. The two films 42 and 43 have a common end which corresponds to the sighting means 44 of the stylus 45.

During their displacement, the two films pass within two reading heads 46, 47 which are illustrated in detail in FIG. 5. These reading heads are rotatably mounted on two pivots 48, 49. The assembly thus formed is fixed on a support panel 50.

FIG. 5 is a schematic view in perspective showing the reading head 47 (the reading head 46 is of identical design).

The film 43 passes through these reading heads which will be described hereinafter. Said film can in fact consist of a microfilm having a height of 8 mm, for example, and comprising a succession of perpendicular transverse lines formed by opaque lines which may be black, for example, and have a width of 75 microns, and by transparent lines having a width of 125 microns.

The reading head itself is formed by two cheeks 51 and 52 which have the intended function of guiding the film without jamming, a space being provided between said cheeks. The size of said space clearly varies according to the thickness of the film In the case of the invention, a thickness of the order of 150 microns has been found satisfactory when using a film having a thickness of approximately 100 microns. Another function of the cheeks mentioned above is to prevent wear of the central portion of the film which will be read under the conditions described hereinafter.

The cheeks 51 and 52 are fixed on a support 50 by any suitable means such as bonding, screwing or the like.

At the center of each cheek aforesaid, provision is made for two drilled holes as designated by the reference numerals 53, 54 in the case of the cheek 51. The two corresponding holes located opposite and formed in the cheek 52 have not been shown in the figure.

Two photoemitters 55, 56 such as infrared-radiation emitters, for example, are placed in the holes formed in the cheek 51. Photoreceivers 57, 58 are fixed in the two holes located opposite and formed in the cheek 52.

As a general rule, the lenses existing on the photoreceivers 57, 58 do not make it possible to read the transfer of a black line having a width of 75 microns.

In order to obtain this result, a window 59 has therefore been interposed between the photoreceivers 57, 58 and the film 43. In accordance with the invention, said window is formed in a microfilm and consists of two parallel slits or openings 60, 61 which are also parallel to the lines of the film and the height of which is slightly smaller than the half-height of said film 43. The two window openings 60, 61 are located one above the other but slightly displaced with respect to each other in the direction of motion of the film, with the result that the photoreceivers are exposed to light and darkness in alternate sequence during displacement of the film 43.

In the example shown in the figure and in the case of the values of thickness of film lines give earlier, the openings or slits 60, 61 have a width of 75 microns.

In one embodiment of the invention, codification of the system is achieved by virtue of the fact that the relative displacement introduced by the window and more particularly by the two openings which are not located one above the other is one-quarter of a period between the two phototransistors. Accordingly, reading produces four different codes for one displacement of 0.2 mm, which therefore corresponds to a resolving power of 50 microns.

Guiding of the end of the film within the reading heads and between the two cheeks is essentially performed by means of two shims 62, 63 in the conventional manner. These shims can be fitted on each cheek 51, 52 by any suitable means such as in particular screws 64, 65.

One of the cheeks 52 is provided for example in the central portion thereof with a recess 66 which is located at the level of the holes 53, 54 and in which the window 59 can be inserted.

It will be noted that guiding of the film takes place under conditions such that only the top and bottom portions of this latter are liable to be subjected to friction and therefore to wear. By way of example, the central portion has a height of the order of 6 mm in the case of an 8-mm film and therefore remains free.

It will also be noted in FIG. 5 that the reading head 47 is mounted on its support by means of a pivot 66 which penetrates into an orifice 67 of the reading head. This pivot (which is designated by the reference 49 in FIG. 4) enables the reading head to rotate about the shaft thus formed during the displacements of the stylus 45.

Reference being made to FIG. 4, it will be noted that the films 43 and 42 which pass freely within the reading head wind around the reels or pulleys 41 and 40 respectively. Said pulleys are placed at an angle of 135 degrees in regard to the pulley 41 with the straight line which passes through the axes of the two reading heads and at an angle of 45 degrees in regard to the reel or pulley 40, the angles being counted in the trigonometric direction.

The film can be attached to the stylus by any suitable means and especially with loops of Kevlar thread.

A point worthy of note is that it is conceivable to construct the device in accordance with the invention with a single film attached to the stylus at the point 44 in the vicinity of its central portion.

In accordance with a particular embodiment of the invention, it has been found that the reading head should have a length of the order of 40 mm so that, when using a film having the characteristics described earlier, a longitudinal clearance of the order of 0.1 is obtained without forming an unduly large angle between the lines of the film and the slits or openings of the window.

It has been found in addition that the cheeks 51 and 52 constituting the reading head had to be rounded on the side corresponding to delivery of the film in order to prevent premature wear of this latter.

As will also have been noted, the width of the black (opaque) and transparent fringes of the film is different. This choice is related to the problem of diffraction of light at the limit of a fringe and to the sensitivity of the photoreceivers and more particularly of the phototransistors in order to obtain electronically an identical relationship between the two steps.

The choice of the support for the film can be made by those versed in the art as a function of the performances which they desire to obtain for the device in accordance with the invention. It has been found that a film of Estar (registred trademark of Eastman Kodak Company) makes it possible to obtain small variations in length as a result of changes in temperature, relative humidity, or tractive force. Generally speaking, any film having high definition or high contrasting power is suitable. This applies to films employed as masks for microfilms which are neither vignetted nor fringed.

Either in the case of the device comprising a film-type strip or on the contrary, comprising a thread, it is essentially to calibrate the apparatus at the time of tensioning in order to set the counters at a strictly accurate value. This calibrating operation can be performed by sighting a well-defined point as designated by the reference 68 in FIG. 4.

As can readily be understood, the photoreceivers are connected to an electronic device having the functions of testing the change of state of the cells, of decoding the direction of displacement as a function of the previous state of the cells, of controlling the addition or subtraction of all the counters containing the distance of the film, and of providing a stable and coherent state of the counters on the output bus. These counters are continuously incremented and decremented independently of the data-processing operation. This data-processing operation in fact consists in computing the coordinates of a point by utilizing the lengths of radii of the circles supplied by the electronic circuitry. These cartesian coordinates are obtained by finding the intersection of two circles when the distance between the two centers and their radius is known. This actually involves only extraction of a square root and calculation of a division.

It is readily apparent that the centers of the circles are respectively the two shafts or pivots 48 and 49, their respective radius being equal to the distance between the stylus and said centers.

For the practical application of the device, at least three means are required:

in order to set the counters at an initial value after having placed the stylus on the calibration point 68. The exactness of the distances calculated subsequently will depend on the accuracy of this sighting operation. From this moment onward, the counters are incremented or decremented independently of the data-processing operation;

in order to instruct the data-processing unit to store the coordinates of said point with a view to permitting a floating origin of the axes (the point which has just been acquired);

in order to take the measurement into account and to perform the computation.

Parameterization of the basic program permits transmission of the result of the calculation in two modes:

Acquisition by point: it is returned to the program of calculation of a cartesian coordinate which corresponds to the calculation performed. As long as this calculation has not been completed or re-initiated, there will not be any transmission of other calculations.

Acquisition of curves: in this case, a first validation permits continuous transmission of all calculations of points. If the stylus remains stationary, there are in that case n identical coordinates. In order to provide a remedy for this state, there has been provided in the basic program of the panel a parameter which defines the minimum grain at which the coordinates are not transmitted, thus avoiding duplication of one and the same coordinate in this type of acquisition.

In order to save time, the basic logic of the device has the intended function of storing the data directly in a table indicated by the user.

The basic logic must be written in machine language and its operation rate depends on the speed of the processor.

In order to process the basic program of the table, recourse can be had to:

the host computer memory and processor, which entails the need to develop an interface card between the table bus and the host bus;

integration, in the electronic circuitry of the device, of an independent processor with random-access memory (RAM) and read-only memory (ROM) containing the basic programs of the device. It is necessary to have a standard bus in order to communicate with any user computer.

It should be mentioned by way of indication that, in one form of construction of the device in accordance with the invention, 256 octets of RAM and 4096 octets of ROM have been employed.

When making use of a device having a larger area, it is preferable to add to the electronic circuitry a means for measuring variations in room temperature when the modifications are taken into account for dataprocessing in order to correct expansion of the film and of the support of the reading-head shafts.

It will naturally be understood that the invention is not limited in any sense to the particular features which have been specified in the foregoing or to the constructional details of the particular embodiments which have been chosen solely by way of example in order to illustrate the invention. Any variants of these embodiments or of their constituent elements may accordingly be contemplated without thereby departing either from the scope or the spirit of the invention. The variants considered will thus include all means constituting technical equivalents of the means described as well as combinations of such means.

What is claimed is:

1. An arrangement for obtaining numerical coordinates of a point whose location is to be determined, comprising:
   (A) stylus means displaceable to the location of the point;
   (B) supply means for supplying under tension a pair of taut, imperforate, elongated film strips both commonly connected to the stylus means for joint displacement therewith, each strip changing in length during said displacement, each strip having light-transmissive regions successively and alternatingly arranged with light-blocking regions in an equidistantly spaced relationship along a longitudinal direction lengthwise of a respective strip, said light-blocking regions extending in mutual parallelism along a transverse direction generally perpendicular to said longitudinal direction; and
   (C) means for digitally measuring the change in length of each strip after said displacement, including two photo-electric reading heads, one for each strip, each head having
      (a) means for guiding each strip through a respective head,
      (b) means at one side of each guided strip, for emitting light,
      (c) means at an opposite side of each guided strip, for detecting the variable intensity of emitted light passing through the light-transmissive regions and blocked by the light-blocking regions of each guided strip, and for generating electrical signals indicative of the number of light-transmissive regions and light-blocking regions which were guided past each head, and
      (d) means for processing the electrical signals to determine the numerical coordinates of the point.

2. The arrangement according to claim 1, wherein the supply means includes a pair of rotatable pulleys about which the strips are successively wound in overlapping relationship during said displacement, and means connected to the pulleys for constantly exerting a tensioning force on the film strips.

3. The arrangement according to claim 1, wherein each strip is of a transparent material which constitutes the light-transmissive regions, said light-blocking regions being constituted by opaque lines on each transparent strip.

4. The arangement according to claim 1, and further comprising a common support, each reading head being pivotably mounted on the common support.

5. The arrangement according to claim 1, wherein each guiding means includes a pair of guide walls spaced apart from each other by a predetermined gap through which a respective strip is guided, said guide walls having spaced-apart contact portions for engaging spaced-apart marginal edge regions of each guided strip, and central recessed portions out of contact with a central region of each guided strip to prevent wear of the central region thereof.

6. The arrangement according to claim 1, wherein the emitting means for each head includes a pair of photoemitters, and wherein the detecting means for each head includes a pair of photodetectors; and further comprising window means past which each film is guided between the photoemitters and photodetectors of each head.

7. The arrangement according to claim 6, wherein each window means includes a pair of windows spaced apart along the longitudinal direction by a fraction of the spacing between two successive light-blocking regions on a respective guided strip, said pair of windows being spaced apart along the transverse direction to enable light emitted at different elevations transversely of a respective strip to pass through the respective windows.

8. The arrangement according to claim 7, wherein each window is elongated along the transverse direction.

9. The arrangement according to claim 7, wherein each window has a transverse width substantially equal to the spacing between two adjacent light-blocking regions, and wherein the electrical signals have a generally sinusoidal shape having a period, and wherein each pair of windows are longitudinally spaced apart by a distance substantially equal to one-fourth of said period.

10. An arrangement for obtaining numerical coordinates of a point whose location is to be determined, comprising:
    (A) stylus means displaceable to the location of the point;
    (B) supply means for supplying under tension a pair of taut, elongated threads both commonly connected to the stylus means for joint displacement therewith, each thread changing in length during said displacement, said supply means including a pair of rotary supply reels, one for each thread, around which the threads are respectively wound and unwound during said displacement;
    (C) means for digitally measuring the change in length of each thread after said displacement, including two reading heads, one for each thread, each head having
        (a) a measuring wheel rotatable about an axis during rotation of the respective supply reel, said measuring wheel having a plurality of radially-extending, light-blocking regions equiangularly spaced about the axis, each two adjacent light-blocking regions bounding a light-transmissive region, (b) means at one axial end region of the measuring wheel, for emitting light, (c) means at an opposite axial end region of the measuring wheel, for detecting the variable intensity of emitted light passing through the light-transmissive regions and blocked by the light-blocking regions of the measuring wheel, and for generating electrical signals indicative of the number of light-transmissive regions and light-blocking regions which passed by each head, and (d) means for processing the electrical signals to determine the numerical coordinates of the point.

11. The arrangement according to claim 10, wherein each supply reel is mounted on a first shaft for rotation about a shaft axis, each head further including a gear wheel mounted on the first shaft for joint rotation with a respective supply reel; and wherein each measuring wheel is mounted on a second shaft, each head further including a pinion mounted on the second shaft for joint rotation with a respective measuring wheel; and wherein each gear wheel is in meshing driving engagement with a respective pinion.

12. The arrangement according to claim 11, wherein the supply means includes means connected to the first shaft of each head, for constantly exerting a tensioning force on the threads.

13. The arrangement according to claim 10, wherein ths supply means includes means for guiding the threads onto and off their respective supply reels, said guiding means including guide posts engaging the threads intermediate the supply reels and the stylus means.

14. The arrangement according to claim 10, wherein the emitting means includes a photoemitter, and wherein the detecting means includes a pair of photodetectors angularly spaced apart about the measuring wheel axis, each photodetector in its turn sensing the presence of light passing through a light-transmissive region, and the absence of light blocked by a light-blocking region.

* * * * *